United States Patent [19]
Chang

[11] Patent Number: 5,755,124
[45] Date of Patent: May 26, 1998

[54] STEERING WHEEL AND AIR BAG LOCK EQUIPPED WITH WARNING LIGHTS

[76] Inventor: Chao-Ling Chang, No. 88-1, Hsi Yuan Rd., Chung Li City, Tao Yuan Hsien, Taiwan

[21] Appl. No.: 832,858

[22] Filed: Apr. 4, 1997

[51] Int. Cl.[6] ............................................. B60R 25/02
[52] U.S. Cl. ........................... 70/209; 70/226; 70/237; 362/61; 362/253
[58] Field of Search ............................ 70/19, 207, 209, 70/211, 212, 225, 226, 237, 238; 362/61, 102, 119, 253, 399

[56] References Cited

U.S. PATENT DOCUMENTS

| | | | |
|---|---|---|---|
| 3,462,982 | 8/1969 | Moore | 70/209 |
| 4,776,766 | 10/1988 | Brent | 362/253 X |
| 4,959,981 | 10/1990 | Davidson | 70/238 |
| 5,097,685 | 3/1992 | Lien | 70/209 |
| 5,199,284 | 4/1993 | Lin | 70/209 |
| 5,297,406 | 3/1994 | Lin | 70/209 |
| 5,363,679 | 11/1994 | Prasad | 70/209 |
| 5,460,021 | 10/1995 | Taylor | 70/209 |
| 5,555,753 | 9/1996 | Matlock | 70/209 |

Primary Examiner—Lloyd A. Gall
Attorney, Agent, or Firm—Morton J. Rosenberg; David I. Klein; Jun Y. Lee

[57] ABSTRACT

Disclosed is a lock for use on a steering wheel having an air bag to particularly protect the air bag from being accessed and stolen. The lock includes a fixing seat having two forward extended and angularly spaced hooking bars and a downward extended rear hooking plate for the seat to fitly mount on a steering wheel. The fixing seat has a middle cover plate which just covers the air bag in the steering wheel. A receiving member is provided on a top of the cover plate to pivotally receive a front driving elbow of the movable rod therein. The locking device is adjustably connected to a rear locking bar of the movable rod and can be locked thereto so that the whole lock can be adapted to a steering wheel of any type and size. A rear end of the locking device is provided with many warning lights. In the event of a car failure on a road, simply turn the movable rod and the locking device locked thereto to an upright position relative to the fixing seat, and the whole lock can be positioned on the ground and used as a warning light. Engagement of a semicircular recess on the driving elbow with a steel ball supported on a spring disposed in a recess on the receiving member permits the movable rod to stably stand upright on the fixing seat.

4 Claims, 4 Drawing Sheets

STEERING WHEEL AND AIR BAG LOCK EQUIPPED WITH WARNING LIGHTS

BACKGROUND OF THE INVENTION

The present invention relates to a multipurpose steering wheel lock which may also protect the air bag equipped with the steering wheel from being stolen and may be used as a warning means. The steering wheel lock according to the present invention mainly includes a fixing seat, a movable rod, and a locking means. The movable rod has one end pivotally connected to the fixing seat and another end adjustably connected to the locking means and locked thereto, so that the whole lock is adapted to lock a steering wheel of any type. A cover plate portion of the fixing seat covers the whole air bag equipped with the the steering wheel, preventing the air bag from being stolen.

Most of the modern cars have the so-called "dual-A" functions. This means the cars are equipped with an air bag and an anti-lock brake system (ABS). Wherein, the air bag is a major protective means for drivers in driving. Due to a high price of the air bag, it has become a main target of many thieves. To protect the property of car owners, it is desireable to have a car lock which may also protect the air bag from being stolen.

On the other hand, a warning means, such as a warning sign or a warning light, is a necessity that should be always prepared in the trunk for use in any car failure on the road to warn cars from backside. However, many car owners tend to forget carrying this important item with their cars. Therefore, it is tried by the inventor to incorporate the warning light with the steering wheel lock which has become more and more popular and is always carried on a car.

SUMMARY OF THE INVENTION

A primary object of the present invention is to provide a steering wheel and air bag lock equipped with warning lights. The lock is so designed that it shall cover the entire air bag when the lock is locked onto the steering wheel. And, the lock has a movable rod which is adjustably connected to a locking means so that the lock is adapted to lock a steering wheel of any type and the air bag provided thereto.

Another object of the present invention is to provide a steering wheel and air bag lock equipped with warning lights wherein the locking means thereof is provided at one end with warning lights. The locking means is connected at the other end to a movable rod which can be pivotally turned relative to a fixing seat of the lock to an upright position and be retained thereto by the engagement of a steel ball on the fixing seat with a semicircular recess on the movable rod, serving as a warning light to warn any back coming vehicles in an emergent condition.

The steering wheel and air bag lock equipped with warning lights according to the present invention is therefore simple in structure and practical in use.

DETAILED DESCRIPTION OF THE DRAWINGS

DETAILED DESCRIPTION OF THE PREFERRED EMBODIMENT

Figure 1:
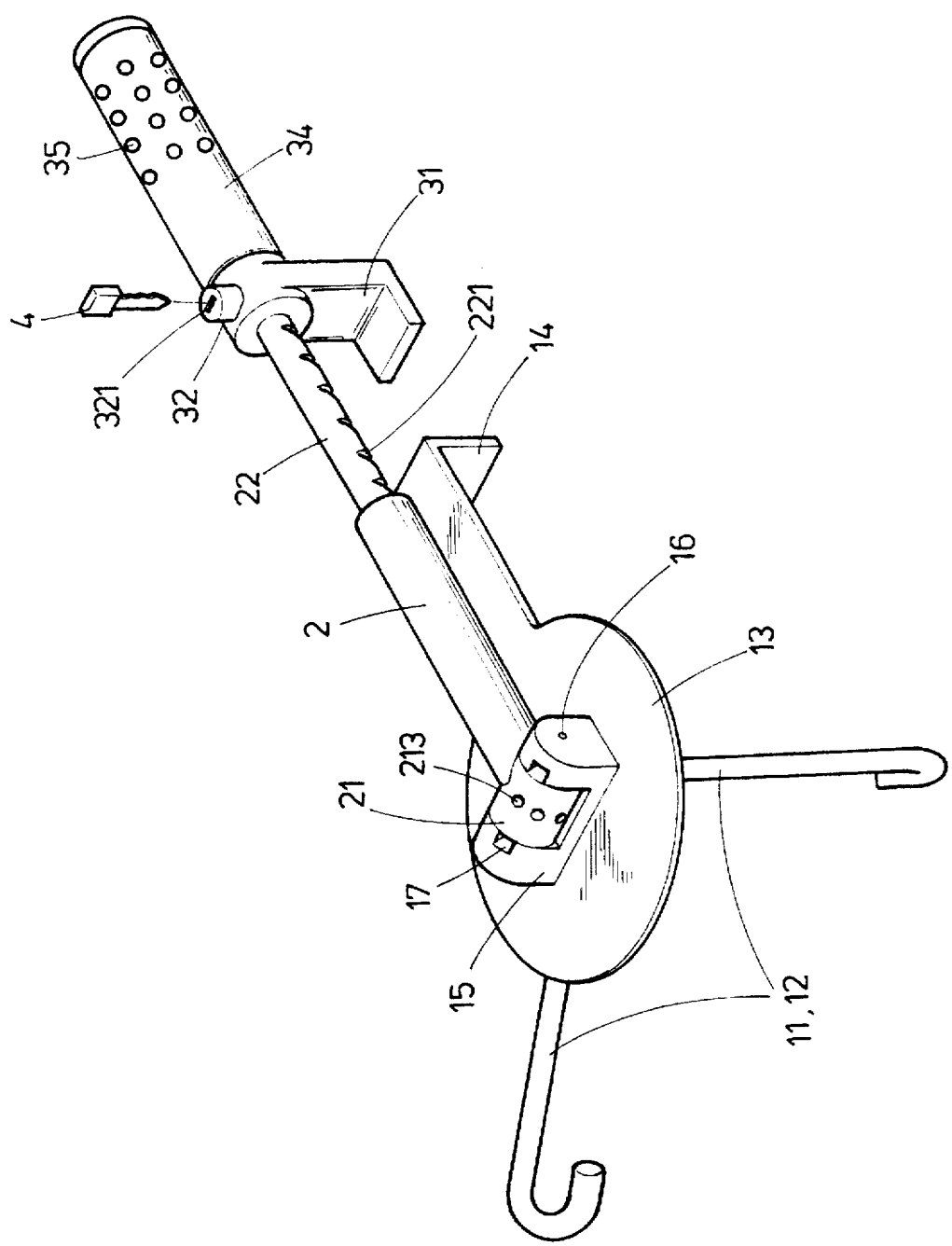
FIG. 1 is a perspective view of the present invention.
Figure 2:
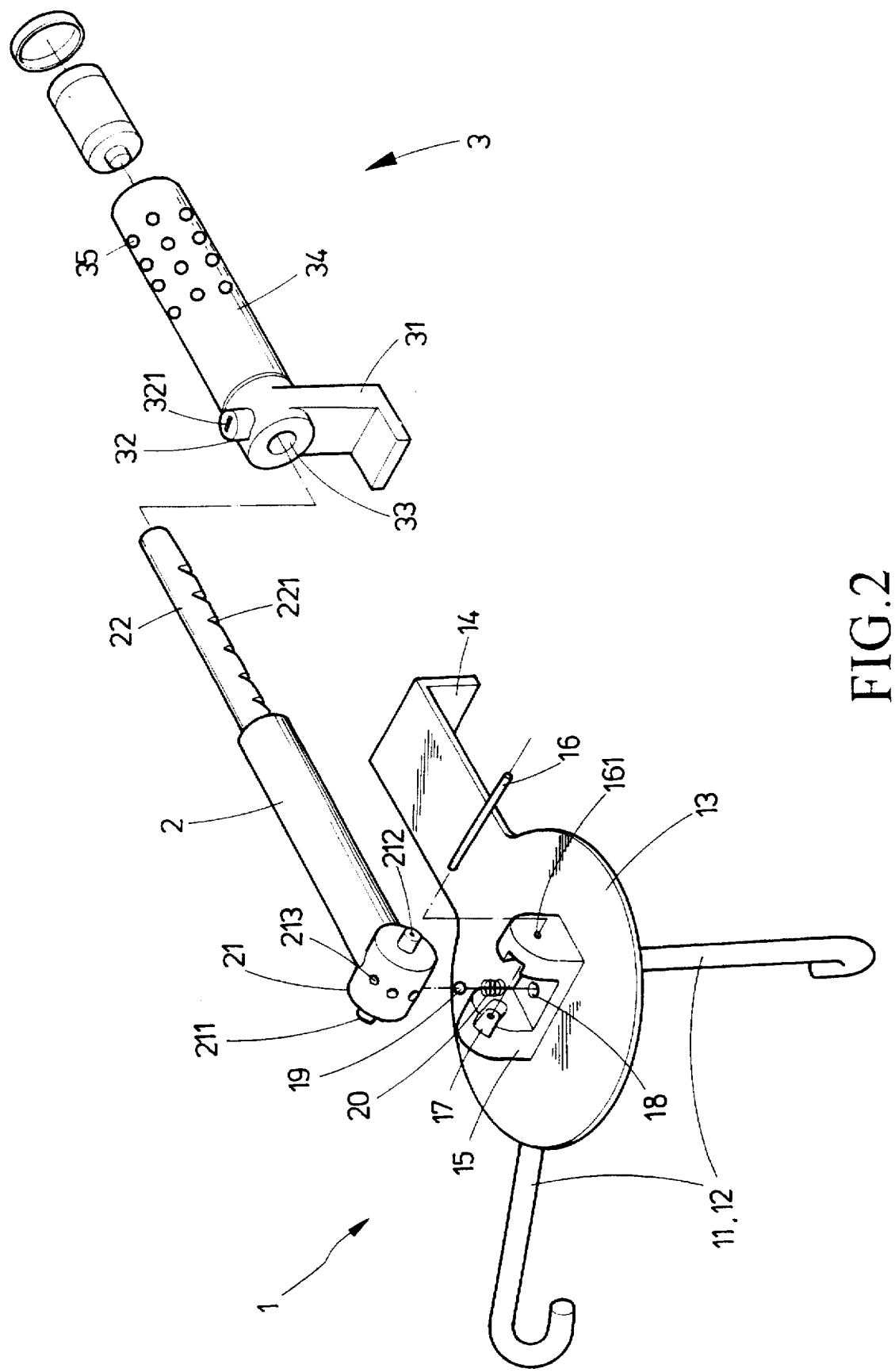
FIG. 2 is an exploded perspective view of the present invention.

Please refer to FIGS. 1 and 2. The present invention mainly includes a fixing seat 1, a movable rod 2, and a locking means 3.

The fixing seat 1 has two properly angularly spaced hooking bars 11, 12 extending forward from a front end of the seat 1 and a hooking plate 14 extending backward and downward from a rear end of the seat 1. A middle part of the fixing seat 1 is a cover plate 13 having a size matching with the size of an air bag. A receiving member 15 is centered on a top of the cover plate 13. The receiving member 15 has two side walls upward extended from two ends thereof. Each of the side walls has a recess 17 formed at an inner surface thereof serving as a shaft seat. A through hole 161 extends through each said side wall and the shaft seat 17 thereof. A ball recess 18 is formed at a middle bottom portion of the receiving member 15 for a spring 20 and a steel ball 19 to dispose therein.

The movable rod 2 is formed at a front end with a driving elbow 21. A plurality of aligned and equally spaced semi-circular recesses 213 are formed around an outer surface of the driving elbow 21. Two shafts 211 separately laterally project from two ends of the driving elbow 21. A through hole 212 extends through the shafts 211 and the driving elbow 21. The movable rod 2 is pivotally connected to the fixing seat 1 by mounting the driving elbow 21 on the receiving member 15 with the two shafts 211 seated in the two recesses 17 and the driving elbow 21 located on the middle bottom portion of the receiving member 15. A pin 16 is used to thread through the holes 161 and the hole 212, so that the driving elbow 21 and accordingly the movable rod 2 are pivotally rotatable about the pin 16 relative to the fixing seat 1. When the steel ball 19 in the ball recess 18 on the bottom portion of the receiving member 15 is pushed upward by the spring 20 to press against one of the semi-circular recesses 213, the movable rod 2 is fixed at a certain desired position relative to the fixing seat 1. The movable rod 2 is provided at a rear end with a locking bar 22. A plurality of equally spaced dents 221 are provided along the locking bar 22 for selectively engaging with the locking means 3.

The locking means 3 is a long hollow member being provided at a lower front end with an L-shaped locking plate 31. A lock head 32 is formed above the locking plate 31. The lock head 32 has a key hole 321 on top for a key 4 to insert into and a locking channel 33 for the locking bar 22 of the movable rod 2 to extend thereinto. When the locking bar 22 extends into the locking channel 33, the dents 221 on the locking bar 22 engage with teeth inside the lock head 32 to firmly lock the locking means 3 to the movable rod 2. A rear end of the long hollow member of the locking means 3 serves as a handle 34 for grip with a hand. A plurality of warning lights 35 are provided on a surface of the handle 34. The warning lights 35 may be formed from light emitting diodes (LEDs). Batteries may be mounted inside the handle 34 to supply power required by the warning lights 35, so that the warning lights 35 can flash at proper time.

Figure 3:
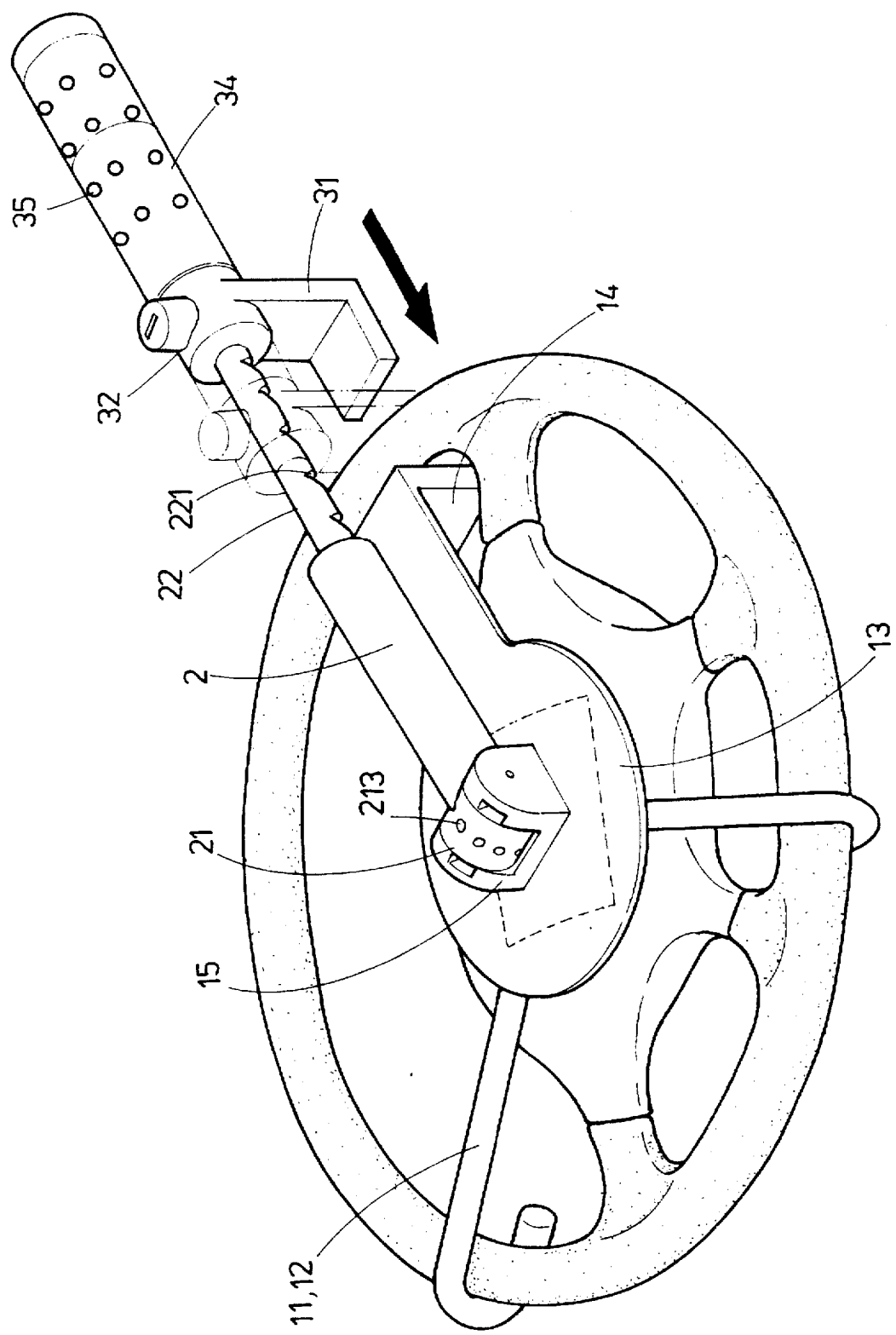
FIG. 3 illustrates the present invention being locked onto a steering wheel.

Please refer to FIG. 3. To lock a steering wheel with the present invention, first position the two hooking bars 11, 12 on the steering wheel at proper locations with the hooking plate 14 falling and stuck in the steering wheel. At this point, the cover plate 13 is just located above and covers the air bag. Then, move the locking means 3 toward the locking bar 22 in the direction indicated by the arrow until the L-shaped locking plate 31 tightly abuts against an outer periphery of the steering wheel. Finally, use the key 4 to lock the locking means 3 to the locking bar 22 and safely protect the air bag from being accessed and stolen. With the present invention, a steering wheel and air bag of any type and size can be locked and protected.

Figure 4:
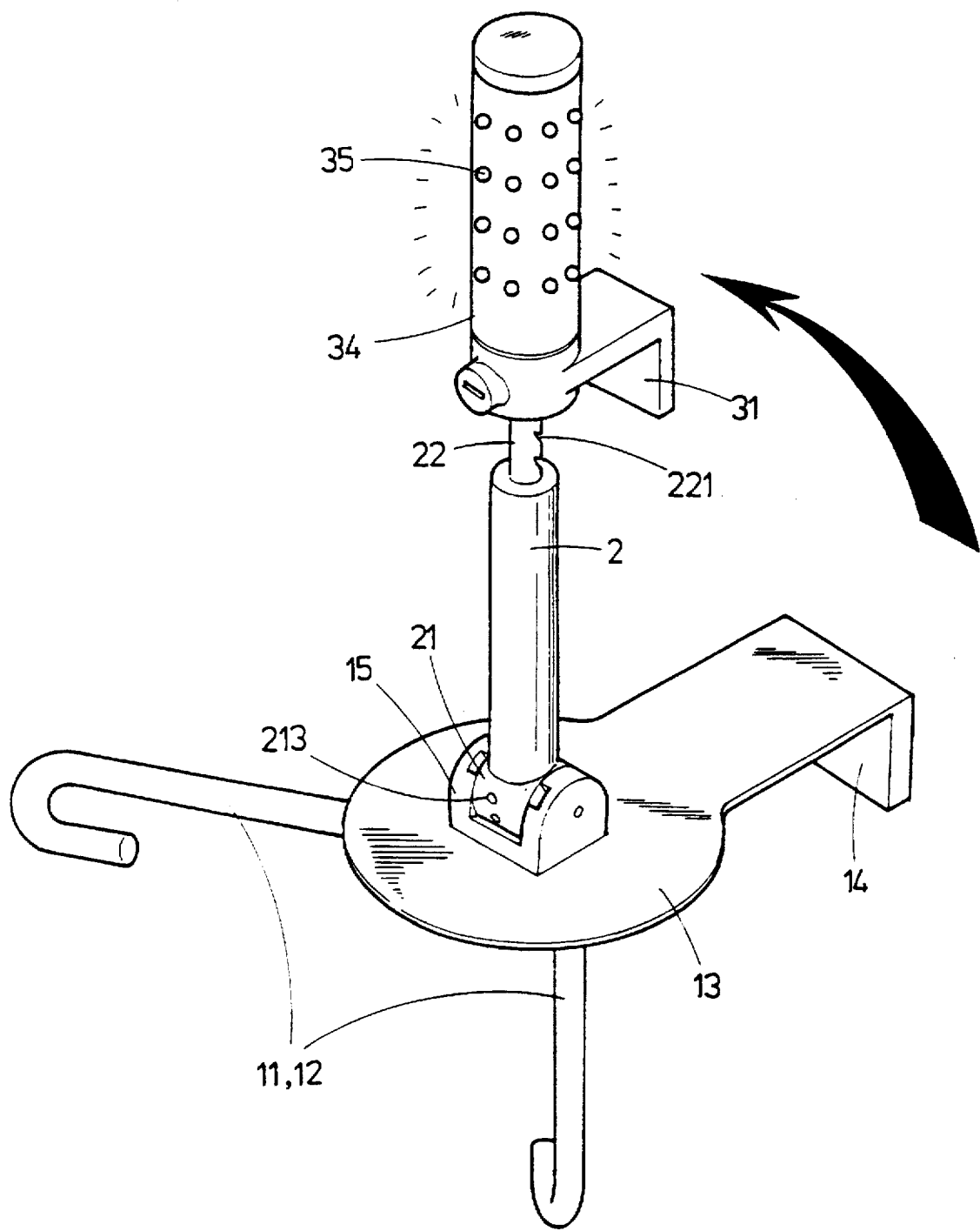
FIG. 4 illustrates the present invention being adjusted in position to be used as a warning light.

When the present invention is to be used as a warning light, just pull the movable rod 2 and the locking means 3 together to an upright position, as shown in FIG. 4. With the semicircular recesses 213 on the driving elbow 21 and the spring 20 and steel ball 19 on the receiving member 15, the movable rod 2 and locking means 3 can be actually adjusted in their position and be stably fixed to a desired position without swinging. After the movable rod 2 is in an upright position, turn on the warning lights 35 on the handle 34, and the LEDs flash to give a warning sign.

Although the present invention has been described with the preferred embodiments thereof, it should be noted that the present invention is not limited to such embodiments and various changes can be made without departing from the spirit of the present invention or the scope of the subjoined claims.

What is claimed is:

1. A steering wheel and air bag lock equipped with warning lights, comprising a fixing seat, a movable rod, and a locking means;

said fixing seat having two angularly spaced hooking bars forward extended from a front end thereof and a hooking plate downward extended from a rear end thereof for fixedly mounting on a steering wheel, said fixing seat further having a middle cover plate portion between said hooking bars and said hooking plate to cover a whole air bag disposed in said steering wheel, said cover plate portion having a receiving member centered on a top thereof;

said movable rod having a front end pivotally connected to said receiving member of said fixing seat and a rear end forming a locking bar; and said locking means having a locking plate provided at a lower front end thereof and a lock head provided above said locking plate, said lock head having a locking channel into which said locking bar of said movable rod is inserted;

whereby when said locking means is locked to said locking bar with said fixing seat mounted on said steering wheel, said steering wheel and said air bag provided thereat are safely locked and protected by said fixing seat, said movable rod and said locking means.

2. A steering wheel and air bag lock equipped with warning lights as claimed in claim 1, wherein said front end of said movable rod has a driving elbow which is seated in said receiving member on said cover plate portion and is pivotally connected thereto by a pin threading through said receiving member and said driving elbow.

3. A steering wheel and air bag lock equipped with warning lights as claimed in claim 1, wherein said locking means has a rear end around which a plurality of warning lights are provided.

4. A steering wheel and air bag lock equipped with warning lights as claimed in claim 1, wherein said locking bar of said movable rod is provided at one side with a plurality of dents which match with teeth provided inside said lock head.

* * * * *